Aug. 30, 1949.     D. F. WARNER     2,480,621
INTAKE AND EXHAUST MANIFOLD PRESSURE-RESPONSIVE
CONTROL FOR ENGINE SUPERCHARGERS
Filed Jan. 6, 1940     3 Sheets-Sheet 1

Inventor:
Donald F. Warner,
by Harry E. Dunham
His Attorney.

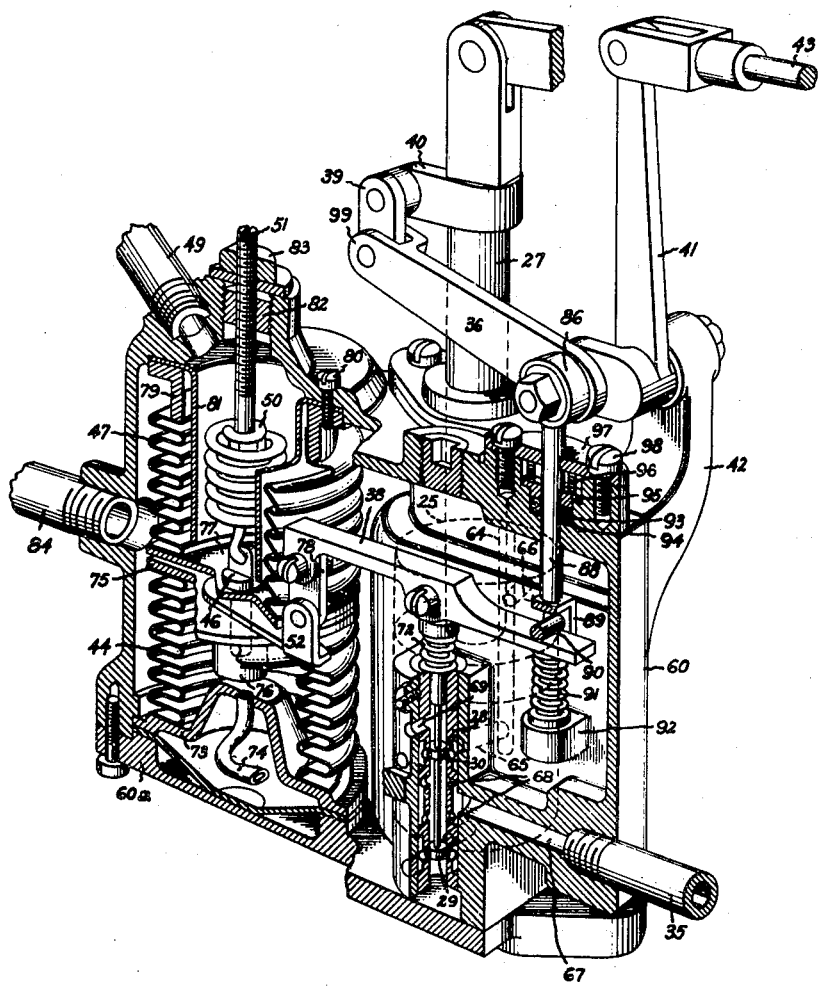

Inventor:
Donald F. Warner,
by Harry E. Dunham
His Attorney.

Patented Aug. 30, 1949

2,480,621

UNITED STATES PATENT OFFICE 2,480,621

INTAKE AND EXHAUST MANIFOLD PRESSURE-RESPONSIVE CONTROL FOR ENGINE SUPERCHARGERS

Donald F. Warner, Swampscott, Mass., assignor to General Electric Company, a corporation of New York Application January 6, 1940, Serial No. 312,721

5 Claims. (Cl. 60—13)

1

The present invention relates to control arrangements for superchargers and the like comprising a compressor or blower for supplying air or like medium under pressure to a consumer and a control mechanism for controlling the operation of the compressor in response to changes of certain operating conditions. More specifically the invention relates to gas turbine driven superchargers including a compressor furnishing air to a combustion engine and a gas turbine arranged to receive exhaust gases from such engine and driving the compressor. Difficulties have heretofore been experienced in obtaining stable operation of exhaust gas turbine driven superchargers especially when used on aircraft.

The object of my invention is to provide an improved construction and arrangement for controlling gas turbine driven superchargers and like power plants whereby accurate quick control and stability of such plants are attained.

A division of this application entitled "Control mechanism," Serial No. 452,024, was filed July 23, 1942, and has now issued as a Patent 2,348,768, assigned to the instant assignee.

For a consideration of what I believe to be novel and my invention, attention is directed to the following description and the claims appended thereto in connection with the accompanying drawing.

Figure 1:
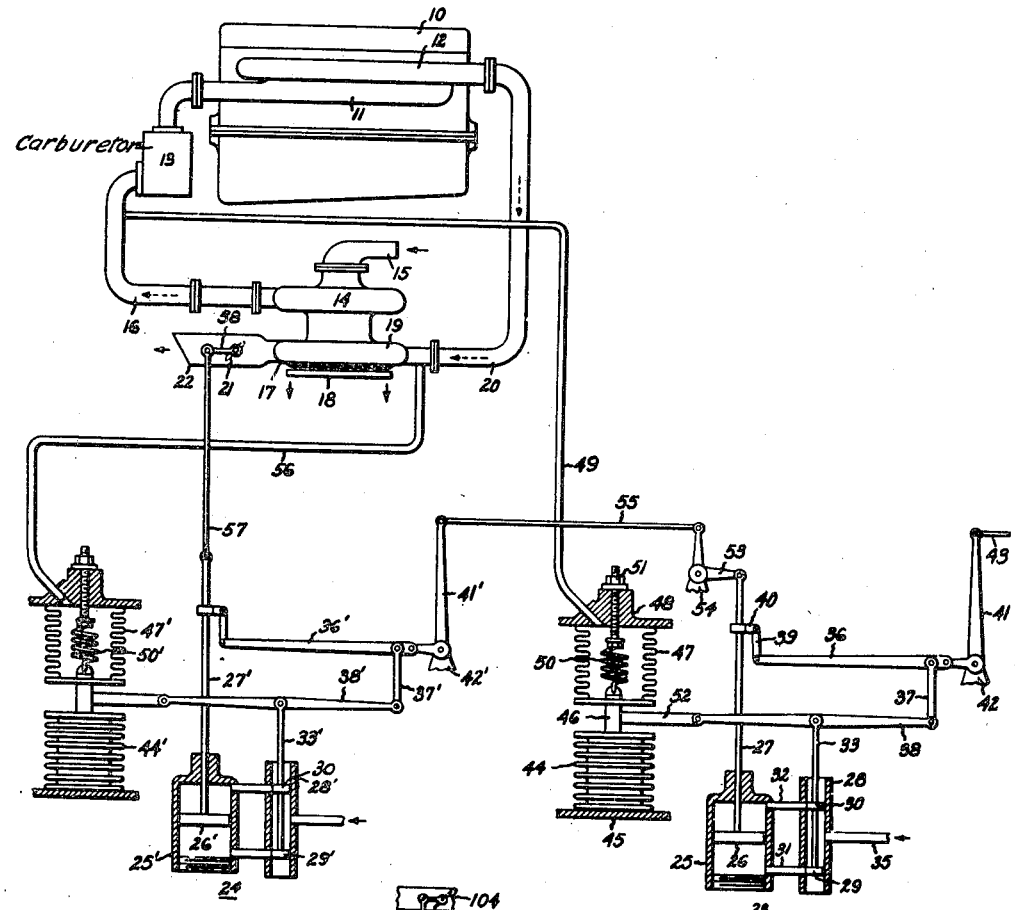
Figure 6:
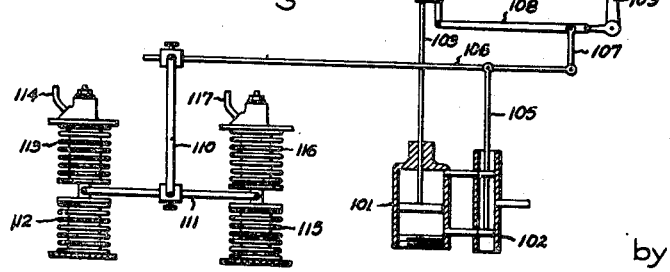
Figure 3:
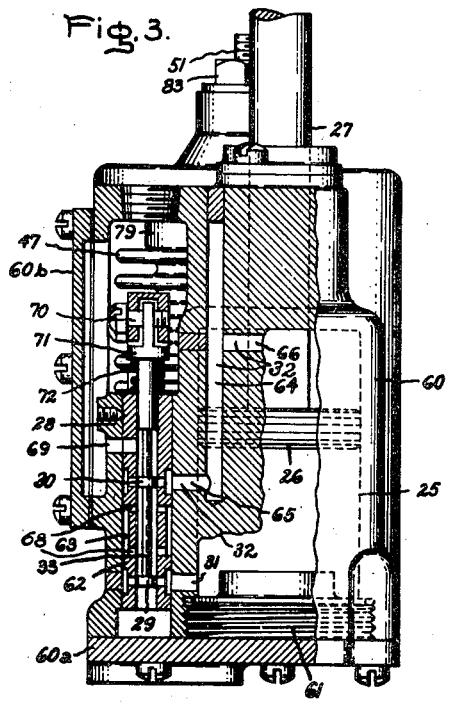
Figure 4:
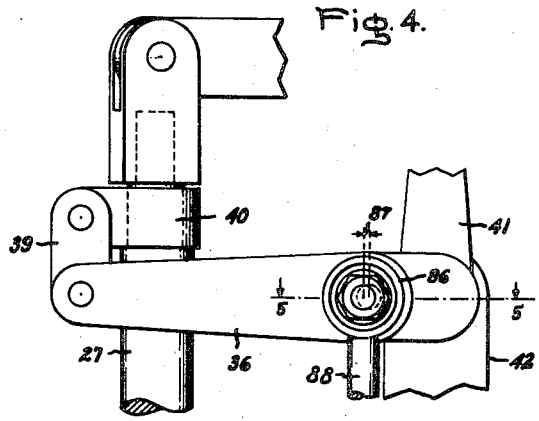
Figure 5:
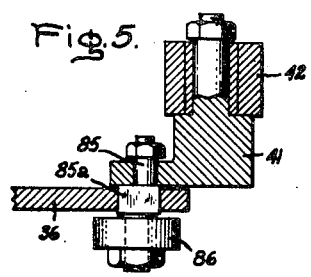

In the drawing Fig. 1 illustrates a diagrammatic view of an aircraft power plant embodying my invention; Fig. 2 illustrates a perspective view of a control mechanism in accordance with my invention; Fig. 3 is a plane front view, partly broken away, of Fig. 2; Fig. 4 is an enlarged detail view of a part of Fig. 2; Fig. 5 is a section along line 5—5 of Fig. 4; and Fig. 6 illustrates a modification of my invention.

The arrangement as shown in Fig. 1 comprises an internal combustion engine 10 as may be used for propelling an aircraft. The engine 10 has an inlet manifold 11 for conducting a mixture of fuel and air to its cylinders and an exhaust manifold 12 through which combustion gases are discharged from the cylinders. The inlet manifold 11 is connected to a carburettor 13 in which fuel and air are mixed and discharged to the inlet manifold 11. Air is supplied to the carburettor 13 from a blower, in the present instance shown as a centrifugal type compressor 14 with an inlet conduit 15 receiving air from the atmosphere and a discharge conduit 16 for discharging the compressed air to the carburettor 13. The compressor 14 is driven in known manner by a gas turbine 17 having a bucket wheel 18 supported on an overhung shaft (not shown) of the compressor 14 and receiving operating gas from a nozzle box 19 having an inlet connected by a conduit 20 to the exhaust manifold 12. The operation of the turbine is controlled by a valve 21 in a waste gate or conduit 22 for discharging gases from the nozzle box 19 to the atmosphere.

During operation, combustion gases of the engine 10 are conducted by the conduit 20 to the nozzle box 19 from which a part of these gases is discharged through the waste gate 22 while any other part is passed through nozzles, not shown, of the nozzle box towards the turbine wheel 18 to effect rotation of the latter. Under fixed conditions, a certain position of the waste gate valve 21 will effect a certain pressure in the discharge conduit 16 of the compressor 14. This pressure may be raised by closing the valve 21 thereby increasing the flow of gases through the bucket wheel and increasing the speed of the gas turbine and the compressor. Vice versa the pressure in the conduit 16 may be reduced by opening the valve 21 to decrease the speed of the turbine and the compressor. In general it is desirable to maintain under certain load conditions a fixed pressure in the inlet to the carburettor, irrespective of changes in barometric pressure, and it is desirable to change the pressure in the conduit 16 in response to load changes on the engine 10. Such change of the position of the valve 21 may be accomplished by a governing mechanism including a device responsive to pressure changes in the conduit 16. If such governing mechanism is one which upon a change in pressure in the conduit 16 causes continuous movement of the waste gate valve 21 until the desired pressure in the conduit 16 is reestablished, it will result in instability of the arrangement. This instability is due to a combination of factors; such a power plant is complex and its equilibrium may be affected by a disturbance in one or more of the factors in the cycle which are the uniformity or unevenness in flow of air to and through the inlet conduit 15 of the compressor, changes in turbine speed, uneven delivery of air to the carburettor, uneven airflow and pressure or quality of gas mixture to the engine cylinders and uneven valving or firing in the cylinders. Such power plants today are usually equipped with speed governors to maintain substantially constant speed by changing the propeller pitch. Any one or more of the various governing devices on the engine may at times become the source of disturbance, if they introduce changes not in accord with the change from equilibrium or if their corrections are made with error or with considerable time lag. As a result a cycle of disturbances may be set up which result in uneven flow of hot exhaust gases to the turbine nozzle box, which condition would call for correction by a change in position of the waste gate.

Briefly, it is the function of the illustrated mechanism to measure conditions at two points, first, the condition at the carburettor or engine inlet, which the pilot or operator would desire to be constant during constant engine power conditions, and second, the condition at the turbine nozzle box. These points are spread widely apart in the cycle of events and a change of condition at one point gradually causes a change of condition at the other point.

My invention may be carried out by a governing mechanism which includes a primary control mechanism or regulator 23 and a secondary control mechanism or regulator 24. The mechanism illustrated is such that for a given altitude and engine power demand the primary regulator 23 which is connected to the carburettor inlet functions to establish a certain pressure setting for the secondary regulator 24. The secondary regulator has its pressure sensitive elements connected to the region of pressure within the nozzle box and acts to maintain the set pressure by moving the waste gate valve 21 in a direction toward opening if the pressure in the nozzle box is too high and by moving the valve 21 in a direction toward closing if the nozzle box pressure is too low. The arrangement of these two regulators causes the primary or carburettor pressure regulator 23 to call for a higher absolute pressure setting on the seconday or nozzle box pressure regulator 24 if the carburettor absolute pressure is below the equilibrium or set value, and the primary regulator 23 calls for a lower pressure setting on the secondary regulator if the carburettor pressure should increase above the equilibrium or set value. Should a change in the state of the hot gases leaving the engine occur, perhaps as a result of uneven firing, the secondary regulator would act independently of the primary regulator's action to preserve the pressure at the nozzle box constant. This system therefore minimizes the effects of conditions which would, otherwise, introduce instability into this complex power cycle. This is so, because its basic regulator is the nozzle box pressure regulator, and this has a simple and direct function to perform, and is not complicated by the reflected action of errors in the rest of the system. In other words this regulator is a simple "back pressure" regulator, and no time lags are involved between the feeling and the reaction except that due to capacity in the nozzle box which is negligible. This stable regulator, as used, has its pressure setting determined by the primary, or carburettor absolute pressure regulator, as noted before.

The primary control mechanism comprises a hydraulic motor 25 with a piston 26 secured to the end of a stem 27 and a control member or pilot valve 28 with valve heads 29 and 30 controlling the supply and discharge of operating fluid under pressure through channels 31 and 32 respectively. The valve heads 29 and 30 are secured to a stem 33. Operating fluid under pressure is supplied to the pilot valve by a supply conduit 35. During operation, upward movement of the pilot valve heads causes flow of fluid under pressure to the upper portion of the cylinder 25 through the conduit 32 and discharge of fluid from the lower portion of the cylinder 25 through the conduit 31 whereby the piston 26 is moved downward until the pilot valve heads are restored to their original positions in which they are alined with the ports connected to the conduits or channels 31, 32. The restoring action of the pilot valve is accomplished in known manner in response to movement of the hydraulic motor piston 26 by means of a restoring lever 36 which has an intermediate point connected by a link 37 to the right-hand end of a floating lever 38. The latter has an intermediate point connected to the pilot valve stem 33. The left-hand end of the lever 36 is connected by a link 39 to a lug 40 fastened to the stem 27. With this arrangement downward movement of the pilot valve causes upward movement of the hydraulic motor piston 26 and its stem 27. The follow-up lever 36 is turned upward about its right-hand end. This causes upward movement of the lever 38 about its left-hand end whereby the original position of the pilot valve heads is restored.

The lever 36 in addition to its restoring function also serves as a control lever. To this end its right-hand end is connected to one arm of a bell-crank lever 41 held on a fulcrum 42 and having another arm pivotally connected to a link or control member 43. The link 43 may be moved by an operator or pilot to change the load output of the engine.

The left-hand end of the floating lever 38 is connected to a device responsive to changes of a condition to be controlled, in the present instance the absolute pressure in the conduit 16. This device comprises a hermetically sealed, evacuated bellows 44 held at its lower end on a support 45 and mechanically connected at its upper end to a stem or pin 46. The latter is also connected to the lower end of a bellows 47 having an upper end held on a fixed support 48. The bellows 47 communicates through a pipe 49 with the conduit 16 and thereby moves during operation in response to pressure changes in the conduit 16. The range of pressure over which the primary mechanism or regulator will control may be varied by an adjustable tension spring 50 disposed within the bellows and connected between an extension of the aforementioned stem 46 and an adjustable bolt and nut 51. The stem 46 has an arm or lug 52 pivotally connected to the left-hand end of the lever 38.

The upper end of the piston stem 27 is connected to one arm of a bell-crank 53 held on a fulcrum 54 and having another arm pivotally connected to a link 55.

During operation an increase in pressure in the conduit 16 causes expansion of the bellows 47 whereby its lower end is moved downward and causes downward movement of the pilot valve 28. The hydraulic motor piston 26 is forced upward and causes counterclockwise turning movement of the bell-crank lever 53 and movement of the link 55 to the left. Movement of the link 55 is transmitted through the secondary control mechanism to the waste gate valve 21, effecting opening of the latter (as will be more fully explained hereinafter) to reduce the power output of the gas turbine and consequently also to reduce the discharge pressure of the compressor 14.

The secondary control mechanism is identical with the primary control mechanism and is connected to the latter by the link 55 and the bell-crank 53. The elements of the secondary control mechanism are designated with the reference characters of the corresponding elements of the primary control mechanism except that they are primed. Thus the secondary mechanism includes a hydraulic motor 25' corresponding to the hydraulic motor 25 of the primary mechanism.

While the bellows 47 of the primary mechanism communicates by a pipe 49 with the conduit 16, the corresponding bellows 47' of the secondary mechanism communicates by a pipe 56 with the inlet conduit of the nozzle box 19. The piston stem 27' of the secondary mechanism is connected by a link 57 to an arm 58 of the waste gate valve 21.

As stated above, an increase in pressure in the conduit 16 causes through the primary mechanism movement of the link 55 towards the left. The operation of the secondary mechanism in response to such movement is as follows: The link 55 causes counterclockwise turning movement of the bell-crank lever 41' about its fulcrum 42', thus moving the lever 36' downward about its left-hand end and effecting downward movement of the link 37' and the lever 38' about its left-hand end. This causes downward movement of the pilot valve stem 33', resulting in the supply of fluid under pressure to the lower portion of the hydraulic motor 25' and discharge of fluid from the upper portion thereof. This effects upward movement of the piston 26' and the stem 27', thereby causing upward movement of the link 57 and opening of the valve 21, resulting in decreased turbine speed and a drop in pressure in the conduit 16. Upward movement of the hydraulic motor stem 27' causes turning movement of the lever 36' about its right-hand end whereby the lever 38' is moved upward and the valve stem 33' with its valve heads 29' and 30' is restored to its original or neutral position.

A decrease in pressure in the conduit 16 causes collapsing of the bellows 47 whereby the lug 52 is moved upward, causing similar upward movement of the pilot valve stem 33 to permit supply of fluid under pressure to the upper part of the hydraulic motor 25 and discharge of fluid from the lower part thereof. This in turn effects downward movement of the piston 26 and movement of the link 55 to the right. The bell-crank lever 41' then is turned in clockwise direction and through its connection to the link 37' and the lever 38' causes upward movement of the pilot valve stem 33', thus effecting supply of fluid under pressure to the upper part of the hydraulic motor 25' and discharge of fluid from the lower part thereof, resulting in downward movement of the stem 27' and the link 57 and closing of the waste gate valve 21. As the waste gate valve 21 is moved towards closing position the pressure in the nozzle box 19 increases. This increase in pressure is transmitted through the pipe 56 to the bellows 47' whereby the latter is expanded downward and effects downward movement of the left-hand end of the lever 38'. In other words, continuous upward movement of the right-hand end of the lever 38' called for by the primary mechanism due to a decreasing pressure in the conduit 16 is at least partly compensated by upward movement of the left-hand end of the lever 38' as the pressure in the nozzle box increases. Thus positioning of the valve 21 due to drop in pressure in the conduit 16 is not continued until the desired pressure in the conduit 16 has been reestablished, but movement of the valve 21 is discontinued or at least slowed down as the pressure in the nozzle box 19 increases. This prevents over-regulation and hunting and renders the mechanism and the operation of the power plant as a whole stable.

The operation of the various elements due to an increase in pressure in the conduit 16 is the same as due to a decrease in pressure in said conduit except that movement of the various elements takes place in opposite direction.

The pressure-responsive bellows 47 and 47' do not effect changes in control action in response to changes of atmospheric pressure due to changes in altitude because these bellows are compensated for altitude changes by the evacuated bellows 44 and 44' respectively.

Thus, with my invention I have accomplished the provision of a gas turbine driven supercharger arrangement including a governing mechanism for controlling the pressure in the discharge of the compressor. The governing mechanism is responsive to the discharge pressure of the compressor and to the inlet pressure of the nozzle box 19 of the elastic fluid or gas turbine. For a steady condition at a given altitude a constant nozzle box pressure predetermines a constant carburettor inlet pressure. Considering the maintaining of a predetermined inlet pressure of the consumer of primary importance, the governing mechanism includes a primary mechanism responsive to said pressure for positioning a turbine valve 21 and a secondary mechanism responsive to the turbine inlet pressure for compensating or retarding movement called for by the primary mechanism. Generally a turbosupercharger arrangement according to my invention is provided with a control mechanism which includes a first device responsive to changes of an operating condition affecting the load output of the turbine or motor and a second device which is interconnected with and counteracts the first device in response to changes of the discharge pressure of the compressor.

In certain installations the prime object may be to maintain a certain turbine inlet pressure. In that case my invention may be explained as including a mechanism for controlling a turbine valve in response to turbine inlet pressure and another mechanism functioning on inlet pressure to the consumer to determine a pressure adjustment for the first mechanism such as to fix the selected pressure of fluid to the consumer. The turbine control valve in the present example is a waste gate valve for controlling the discharge to atmosphere of fluid from the nozzle box of a single stage gas turbine. Broadly, such valve controls the load output of the turbine and it is immaterial whether such valve controls the discharge of fluid from the inlet nozzle box or chest or the discharge from or supply of fluid to any stage of a turbine.

As pointed out above, the primary and secondary mechanisms are alike. Figs. 2 to 5 show the mechanical design of one of the mechanisms. The various elements in these figures are designated with the reference characters of similar elements of the primary mechanism 23 in Fig. 1. As best shown in Fig. 2, the mechanism forms a compact structure with the various elements supported on and partly formed by and inclosed in a casing 60. The casing 60 has a detachable bottom 60a and a detachable side plate 60b and is machined to form the bore of the hydraulic cylinder 25 closed at its lower end by a plug 61. The pilot valve 28 includes a sleeve 62 inserted in a bore 63 of the casing 60. The conduit 31 between the hydraulic motor 25 and the pilot valve 28 is formed by a horizontal bore in the casing and the conduit 32 is formed by a vertical bore 64 connected by a lower horizontal bore 65 to the pilot valve and by an upper horizontal bore 66 to the hydraulic cylinder. Fluid is supplied to the pilot valve by the conduit 35 connected to a channel 67 in the casing 60 and ports 68 in the sleeve 62. During operation fluid from the hydraulic motor 25 is discharged in response to movement of the pilot valve heads in upward direction from the open lower end of the pilot valve sleeve 62 directly into the interior of the casing 60. Upon downward movement of the pilot valve heads, fluid is discharged form the hydraulic cylinder 25 through a port 69 formed in the sleeve and the casing.

The upper end of the pilot valve stem is connected to the lever 38 by a pivot 70 (Fig. 3). In order to reduce or eliminate play between the pivot 70 and the pilot valve stem 33 an abutment 71 formed on an upper portion of the stem 33 is biased upward by a spring 72 between the abutment and the upper face of the sleeve 62.

The evacuated bellows 44 has a lower end plate 73 dished inward and with a central portion connected to a small tube 74 through which the bellows is evacuated after assembly, the tube 74 being subsequently sealed. An upper end plate 75 of the bellows has a central projection 76 projecting into proximity of the dished-in portion of the lower plate 73. The projection 76 with said dished-in portion limits collapsing movement of the evacuated bellows. The upper bellows 47 has a lower end plate 77 which is secured to the upper end plate 75 of the evacuated bellows by means of the pin 46. The lug 52 has a portion securely held between the plates 75 and 77 and another upward bent portion connected to the left-hand end of the floating lever 38 by a link 78. The upper end of the bellows 47 is securely held on the casing 60 by a flanged ring 79 and a plurality of screws 80. Collapsing movement of the bellows 47 is limited by a flanged cylinder 81 located inside the bellows 47 with its lower portion extending to the proximity of the plate 77 and its upper flanged portion held between the ring 79 and the casing 60. The pipe 49 is connected into an opening of the casing communicating with the bellows 47. The spring 50 is held at its lower end on the pin 46 and at its upper end on the bolt 51 which passes through a nut 82 and a lock nut 83. Loosening of the lock nut 83 permits adjustment of the bolt or screwthreaded rod 51. The left-hand portion of the casing in Fig. 2 is connected to a drain conduit 84 through which operating fluid discharged from the hydraulic motor and the pilot valve is drained from the casing.

The right-hand end of the floating lever 38 is connected to the follow-up and control lever 36. This connection in the diagrammatic view of Fig. 1 is formed by the link 37 pivoted to a point near the right-hand end of the lever 36. The follow-up movement of the lever 36, that is, the ratio of movement between the motor 25 and the pilot valve 28 is very small. In a particular arrangement which has been in operation this ratio is of the order of 1:200. To obtain such a reduction the distance between the connection of the link 37 with the lever 36 and the right-hand end of this lever has to be about 1/200 of the total length of the lever 36. This is accomplished by my invention by a link or like connecting element engaging an eccentric on the right-hand end of the lever 36, that is, on the pivotal connection between the lever 36 and the bell crank 41.

The fulcrum 42 for supporting the bell crank 41 is formed by a bracket on the casing 60. One arm of the bell crank 41, as explained above, is pivotally connected to the operating link 43 and the other arm of the bell crank 41 is pivotally connected to the right-hand end of the lever 36. The pivot connection between the bell crank 41 and the lever 36 is formed by a pivot 85 rigidly secured to the lever 36 and prevented from rotation relative to the lever 36 by a square member 85a (Fig. 5) located in a square opening in the lever 36. The pivot 85 on one side of the square member 85a projects loosely through an opening in the bell crank 41. An eccentric 86 is formed on the other side of the square member 85a. The eccentricity, that is, the distance between the centers of the pin 85 and the eccentric 86 is designated with the character 87 (Fig. 4). The eccentric 86 corresponds to the pivot between the link 37 and the lever 36 in Fig. 1. The lower central portion of the eccentric 86 engages the upper end of a rod 88 which has a lower, forked portion 89 with prongs on opposite sides of the lever 38 and a pin 90 between the prongs in engagement with the upper surface of the lever 38. The right-hand end of the lever 38 is biased upward into engagement with the pin 90 by a compression spring 91 held on a lug 92 (Fig. 2) formed by the casing 60. The spring 91 maintains engagement between the lever 38, the rod 88 and the eccentric 86.

The rod 88 is guided in a bearing formed by the casing 60. The rod 88 and the stem 27 of the hydraulic motor are the only movable elements passing through openings in the casing, the latter forming a bearing for each of these elements. Leakage of fluid along these bearings past the casing is reduced by packings. The packings for the rod 88 and the piston stem 77 are similar. As shown in Fig. 2 the packing for the rod 88 comprises a ring 93 of flexible fluid-retaining material located in a groove 94 of the casing and biased downward by a flanged ring 95 and a plurality of coiled springs 96 between the flanged ring 95 and a cover plate 97 fastened to the casing by screws 98.

The left-hand end of the lever 36 (Fig. 2) has a forked portion 99 connected by the link 39 to the lug 40 on the hydraulic motor stem 27. The forked connections between the various levers and links provide for a rigid construction and reduce undesirable movement of these elements due to play or clearances between them. Also, these forked connections and the bar-shaped lever and link constructions permit these elements to be made of light weight, an important consideration when used on aircraft.

In certain cases the primary and secondary control mechanisms may be combined into a single unit with the absolute pressure responsive devices connected to operate a single hydraulic motor. Such an arrangement as shown in the modification of Fig. 6 comprises a hydraulic motor 101 controlled by a pilot valve 102 corresponding to the motor 25 and the pilot valve 28 respectively of Fig. 1. The hydraulic motor has a piston stem 103 for positioning a control member or valve 104 corresponding to the valve 21 of Fig. 1. The pilot valve 102 has a stem 105 connected to a floating lever, 106. The right-hand end of the latter is connected by a link 107 to a follow-up and control lever 108 connected at its left-hand end to the piston stem 103 and at its right-hand end to a bell crank 109 corresponding to the bell crank 41 of Fig. 1. The left-hand end of the lever 106 is adjustably connected by means including a link 110 to an intermediate point of a lever 111. The left-hand end of the lever 111 is connected to an absolute pressure responsive device including an evacuated bellows 112 and another bellows 113 to be subject to pressure variations by a pipe 114. The bellows 112, 113 are arranged in alinement with their opposite ends secured to supports and their adjacent ends pivotally connected to the lever 111. These bellows correspond to bellows 44', 47' of Fig. 1. The right-hand end of the lever 111 is similarly connected to two alined bellows, an evacuated bellows 115 corresponding to bellows 44 of Fig. 1 and a bellows 116 corresponding to bellows 47 of Fig. 1 and to be subjected to pressure variations through a pipe 117 corresponding to pipe 49 of Fig. 1. The operation of the mechanism is similar to that of Fig. 1 except that both pairs of bellows operate directly on the left-hand end of the lever 106. A drop in pressure in the pipe 117 corresponding to pipe 49 of Fig. 1 causes collapsing of the bellows 116, whereby the right-hand end of the lever 111 is moved upward about its left-hand end and causes upward movement of the left-hand end of the lever 106 to effect through the action of the hydraulic motor closing of the valve 104. The link 110 is adjustably connected to the levers 106 and 111. This adjustable connection permits variation of the relative effects of the two absolute pressure responsive devices. In a system as described above the adjustable connection permits variation of the time lag of the mechanism.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Power plant comprising a consumer, a compressor having a discharge conduit for supplying air under pressure to the consumer, a gas turbine for driving the compressor and having an inlet conduit connected to receive gases from the consumer, means for controlling the load output of the elastic fluid turbine including a governing mechanism responsive to pressure changes in both said inlet and discharge conduits, said governing mechanism including a primary mechanism having a device responsive to pressure changes in the discharge conduit and a secondary mechanism responsive to movement of the primary mechanism and to pressure changes in the inlet conduit.

2. Power plant comprising a consumer, a compressor having a discharge conduit for supplying air under pressure to the consumer, a gas turbine for driving the compressor and having an inlet conduit connected to receive gases from the consumer, means for controlling the load output of the turbine including a governing mechanism responsive to pressure changes in both said inlet and discharge conduits, said mechanism including a primary mechanism having a lever for manual operation and a device responsive to changes of absolute pressure in the discharge conduit, and a secondary mechanism mechanically connected to the primary mechanism and having a device responsive to changes of absolute pressure in the inlet conduit.

3. The combination of an airplane propelling engine having an intake manifold and an exhaust manifold, a supercharger having air intake means and a discharge conduit connected to supply air under pressure to the intake manifold, an exhaust turbine connected to receive exhaust fluid from the exhaust manifold for driving the supercharger, means for controlling the absolute pressure of exhaust fluid supplied to the turbine, regulating means responsive jointly to variations in intake manifold pressure and in exhaust manifold pressure for controlling the turbine to maintain automatically constant intake manifold pressure regardless of variations in the pressure of intaken air and in the resistance to discharge of exhaust gas arising from changes of altitude, and pilot-operated means to set said regulating means.

4. The combination of an aircraft propelling engine having an intake manifold and an exhaust manifold, a supercharger for supplying air to the intake manifold, a motor connected to the exhaust manifold to be driven by the exhaust fluid for driving the supercharger, a member to vary the exhaust pressure effective to drive the motor, means to regulate said member automatically in response to changes in exhaust pressure or changes in manifold pressure, or both, to maintain automatically substantially constant intake manifold pressure.

5. Automatic control mechanism for a turbo supercharger driven by the exhaust gas from an internal combustion engine and delivering air to the intake of such engine, comprising means responsive to pressure changes in such air intake, a control for regulating the amount of exhaust gas serving to drive such supercharger, means responsive to changes in exhaust pressure of such engine, motor means automatically and compensably operated in response to operation of said intake pressure responsive means and said exhaust pressure responsive means, and manually operable means to alter the setting of the intake pressure responsive means.

DONALD F. WARNER.

REFERENCES CITED

The following references are of record in the file of this patent:

UNITED STATES PATENTS

| Number | Name | Date |
| --- | --- | --- |
| 1,476,418 | Rice | Dec. 4, 1923 |
| 1,547,695 | Sherbondy | July 28, 1925 |
| 1,816,787 | Moss | July 28, 1931 |
| 2,005,821 | Büchi | June 25, 1935 |
| 2,148,230 | Berger | Feb. 21, 1939 |
| 2,305,810 | Müller | Dec. 22, 1942 |

FOREIGN PATENTS

| Number | Country | Date |
| --- | --- | --- |
| 479,278 | Great Britain | Jan. 28, 1938 |
| 801,587 | France | May 23, 1936 |